United States Patent
Backman et al.

(10) Patent No.: US 12,028,697 B2
(45) Date of Patent: Jul. 2, 2024

(54) METHOD AND SYSTEM OF SOUND PROCESSING FOR MOBILE TERMINAL BASED ON HAND HOLDING AND ORIENTATION DETECTION

(71) Applicant: AAC Microtech (Changzhou) Co., Ltd., Changzhou (CN)

(72) Inventors: Juha Backman, Tampere (FI); Lauri Veko, Tampere (FI)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 200 days.

(21) Appl. No.: 17/881,638

(22) Filed: Aug. 5, 2022

(65) Prior Publication Data

US 2024/0048929 A1 Feb. 8, 2024

(51) Int. Cl.
| | |
|---|---|
| H04S 7/00 | (2006.01) |
| H04M 1/02 | (2006.01) |
| H04M 1/60 | (2006.01) |
| H04M 1/72448 | (2021.01) |
| H04M 1/72454 | (2021.01) |
| H04R 3/04 | (2006.01) |
| H04R 5/04 | (2006.01) |

(52) U.S. Cl.
CPC ........... *H04S 7/30* (2013.01); *H04M 1/72448* (2021.01); *H04R 3/04* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 2014/0044286 A1* | 2/2014 | Coles ................... | G06F 1/1694 381/150 |
| 2015/0089386 A1* | 3/2015 | Brisebois ............ | G06F 3/04817 715/746 |
| 2015/0181337 A1* | 6/2015 | Rodgers ............... | G06F 1/1688 381/304 |
| 2016/0227320 A1* | 8/2016 | Harvey .................. | H04S 1/002 |
| 2018/0246693 A1* | 8/2018 | Xu ......................... | G06F 3/165 |
| 2019/0158957 A1* | 5/2019 | Breebaart .............. | H04M 1/03 |
| 2020/0128233 A1* | 4/2020 | Jannard ................ | H04N 13/398 |
| 2021/0132665 A1* | 5/2021 | Liu ........................ | G06F 3/0445 |
| 2022/0225026 A1* | 7/2022 | Kou ........................ | H04R 3/04 |

* cited by examiner

*Primary Examiner* — Qin Zhu
(74) *Attorney, Agent, or Firm* — W&G Law Group

(57) ABSTRACT

Provided is a method and system of sound processing for a mobile terminal based on hand-holding and orientation detection. The method includes: detecting whether the mobile terminal is held by hand; in response to determination of the mobile terminal being held by hand, detecting whether it is one-hand holding or two-hand holding; in response to determination of one-hand holding, detecting whether it is landscape holding or portrait holding, and conducting corresponding frequency response equalization and stereo processing control; and in response to determination of two-hand holding, determining whether the mobile terminal is in an interaction procedure, and conducting corresponding frequency response equalization and stereo processing control. Compared with the related art, the problem that frequency response of the speakers of existing mobile terminals significantly changes with different holding postures that may eventually lead to poor sound quality is solved, to provide more consistent speaker sound quality in real life.

10 Claims, 4 Drawing Sheets

METHOD AND SYSTEM OF SOUND PROCESSING FOR MOBILE TERMINAL BASED ON HAND HOLDING AND ORIENTATION DETECTION

TECHNICAL FIELD

The present disclosure relates to the technical field of audio signal processing and, in particular, to a method and a system of sound processing for a mobile terminal based on hand-holding and orientation detection.

BACKGROUND

A well-known characteristic of a mobile terminal such as cellphone, game console or tablet computer is that frequency response of a speaker significantly changes when a user holds the device in his/her hand. This results in coloration of the sound, and since all stereo widening algorithms rely on frequency response having a reasonably symmetry, holding the device with one or two hands significantly changes capabilities of stereo or multi-channel processing. Recent researches have shown that there are some clear systematic trends in this kind of frequency response variation that may apply to all users. The frequency response variation depends on how the mobile terminal is held in hands, that is, whether the device is held in one hand or two hands, and the specific orientation of the device.

SUMMARY

The purpose of the present disclosure is to provide a method and system of sound processing for a mobile terminal based on hand holding and orientation detection to solve the technical problems in the related art, which can correct the frequency response of the speaker and adjust the speaker equalization.

The present disclosure provides a method of sound processing for a mobile terminal based on hand holding and orientation detection, including: detecting whether the mobile terminal is held by hand; in response to determination of the mobile terminal being held by hand, detecting whether it is one-hand holding or two-hand holding; in response to determination of one-hand holding, detecting whether it is landscape holding or portrait holding, and conducting corresponding frequency response equalization and stereo processing control; and in response to determination of two-hand holding, determining whether the mobile terminal is in an interaction procedure, and conducting corresponding frequency response equalization and stereo processing control.

As an improvement, in response to determination of landscape holding, conducting landscape frequency response equalization and stereo processing control.

As an improvement, in response to determination of portrait holding, conducting portrait frequency response equalization and stereo processing control.

As an improvement, in response to determination of the mobile terminal not being in interaction, conducting a substantial two-channel landscape frequency response equalization and stereo processing control.

As an improvement, in response to determination of the mobile terminal being in interaction, conducting a substantial interactive frequency response equalization and stereo processing control.

The present disclosure also provides a system of sound processing for a mobile terminal based on hand holding and orientation detection, including: a first detection module, configured to configured to detect whether the mobile terminal is held by hand(s), and detect whether it is one-hand holding or two-hand holding; a second detection module, configured to detect physical orientation of the mobile terminal, the physical orientation comprising landscape holding or portrait holding; a third detection module, configured to detecting whether the mobile terminal is in interaction; and a correction module, configured to use the detected data from the first detection module, the second detection module and the third detection module to correct a frequency response of a speaker.

As an improvement, the first detection module comprises means for detecting a holding posture of the mobile terminal.

As an improvement, the second detection module comprises means for detecting a physical orientation of the mobile terminal.

As an improvement, the third detection module comprises means for detecting whether a user interacts with a touch screen during audio playback.

As an improvement, the correction module comprises means for correcting the frequency response of the speaker.

Compared with the related art, the method and system of sound processing for a mobile terminal based on hand-holding and orientation detection according to the present disclosure effectively solve the technical problem that the frequency response of the speaker of the existing mobile terminal will significantly change with different holding postures that may eventually lead to poor sound quality. The method and system of sound processing provide more consistent speaker sound quality in real life compared with traditional mobile terminals which do not consider changes in the acoustic environment.

DESCRIPTION OF EMBODIMENTS

The following describes embodiments of the present disclosure in detail, examples are illustrated in the accompanying drawings. The same or similar reference signs refer to the same or similar elements or elements having the same or similar functions. The embodiments described below with reference to the accompanying drawings are exemplary and are only used to explain the present disclosure, but not to be construed as limitations to the present disclosure.

As shown from FIG. 1 to FIG. 8, an embodiment of the present disclosure provides a method of sound processing for a mobile terminal based on hand-holding and orientation detection, including the following steps.

Step A: Detecting whether the mobile terminal is held by hand(s). When comparing the frequency response of the mobile terminal to free field measurement, the result shows that (average of 56 measurements from 14 users) the user's hand provides some boost above about 1.5 kHz, and a strong boost above 10 kHz, this is apparently from palm reflection, these data are highly dependent on the position of the sound port(s) on the terminal and varies greatly among users, but the average value here describes the typical features among all tested users.

Step B: In response to determination of the mobile terminal being held by hand(s), detecting whether it is one-hand holding or two-hand holding.

Step C: In response to determination of one-hand holding, detecting whether it is landscape holding or portrait holding, and conducting corresponding frequency response equalization and stereo processing control. The holding posture includes one-hand holding and two-hand holding. Under two different holding postures, the distance between the position of the sound port on the mobile terminal from the palm of user is different, resulting in boost difference. The frequency response of the speaker is adjusted according to the detected boost data value. The orientation of the mobile terminal includes portrait orientation and landscape orientation, and the frequency response of the speaker will also be significantly different when the mobile terminal is in the portrait and landscape orientations.

Figure 1:
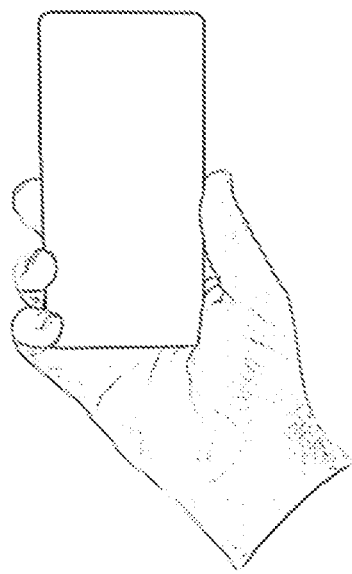
FIG. 1 is a front view of portrait holding of a mobile terminal according to an embodiment of the present disclosure.
Figure 2:
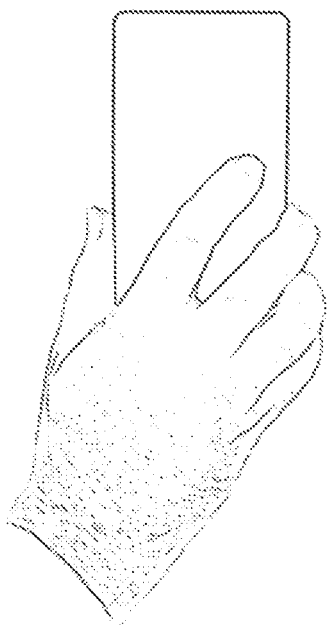
FIG. 2 is a rear view of the portrait holding of a mobile terminal according to an embodiment of the present disclosure.
Figure 3:
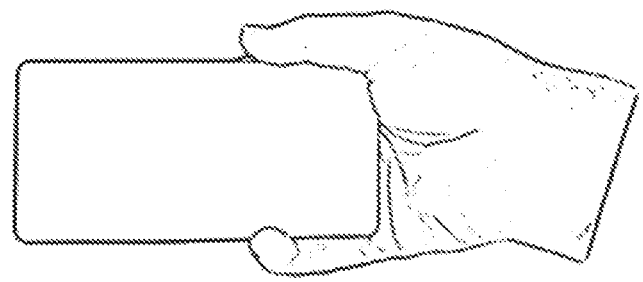
FIG. 3 is a front view of landscape holding of a mobile terminal according to an embodiment of the present disclosure.
Figure 4:
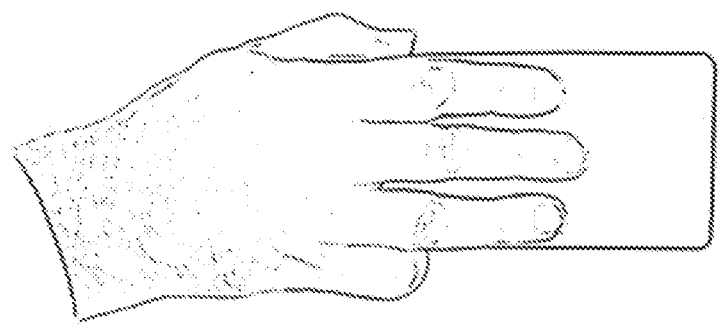
FIG. 4 is a rear view of the landscape holding of a mobile terminal according to an embodiment of the present disclosure.
Figure 5:
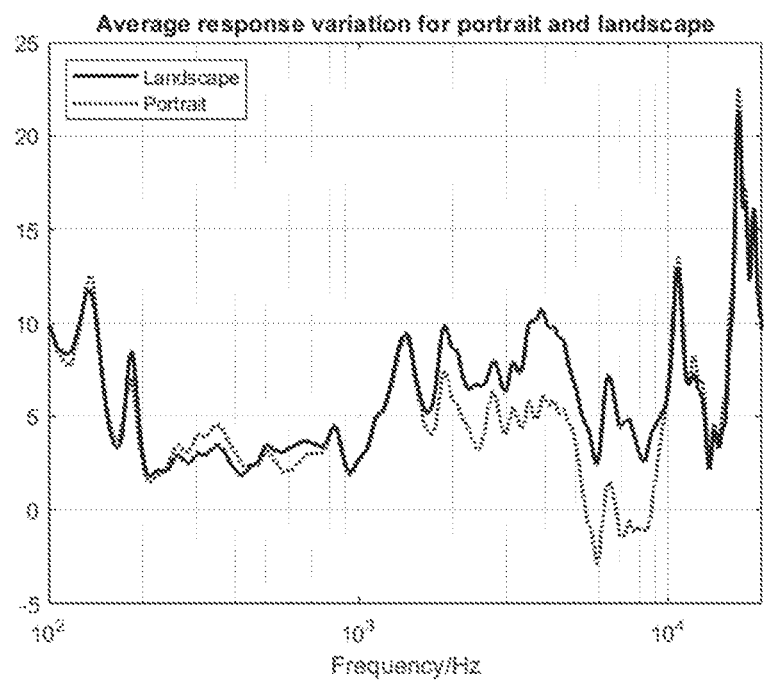
FIG. 5 is a schematic diagram showing a comparison of average response changes of a mobile terminal in free field measurement between portrait holding and landscape holding according to an embodiment of the present disclosure.
Figure 6:
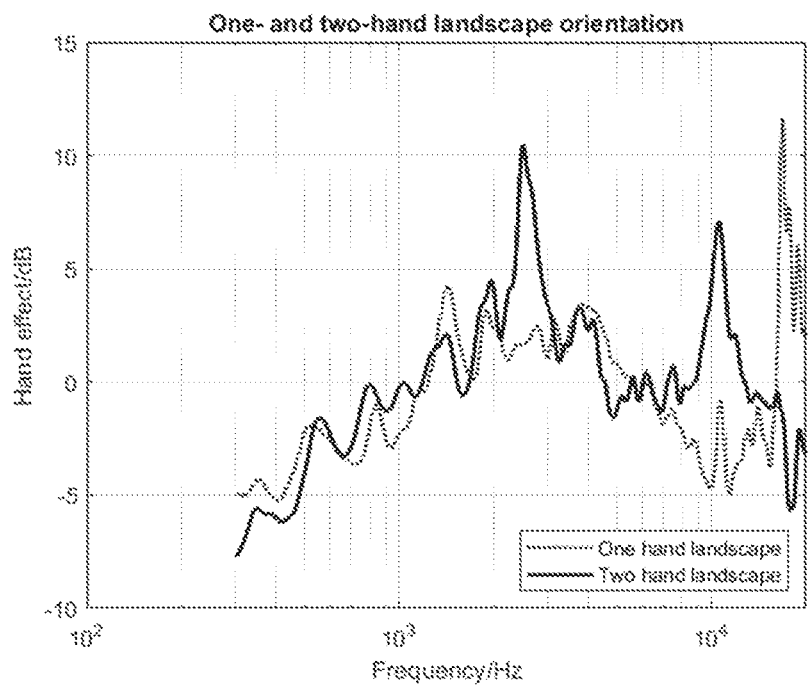
FIG. 6 is a schematic diagram showing response changes of a mobile terminal in free field measurement when holding by one hand or two hands according to an embodiment of the present disclosure.
Figure 7:
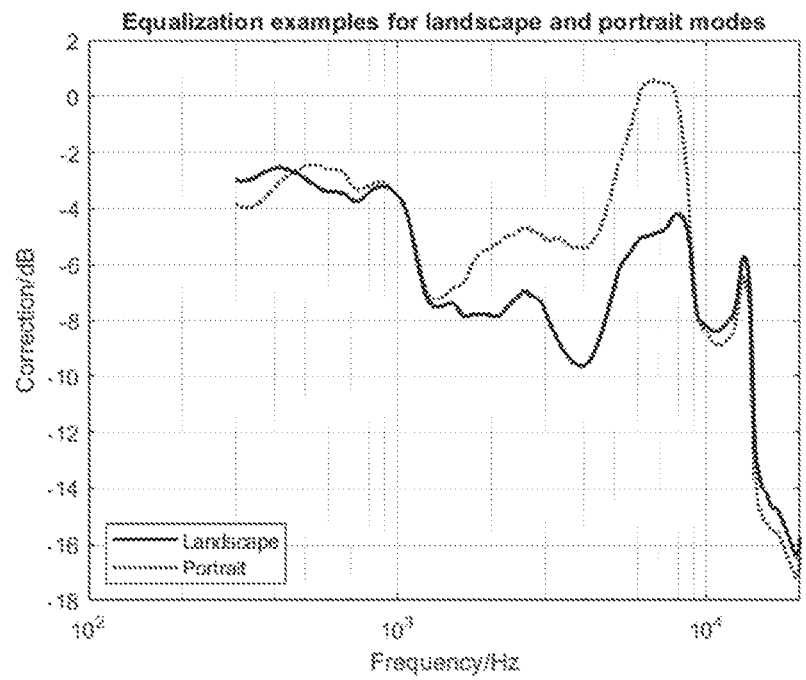
FIG. 7 is a schematic diagram showing equalization of free field measurement from holding response a mobile terminal according to an embodiment of the present disclosure.
Figure 8:
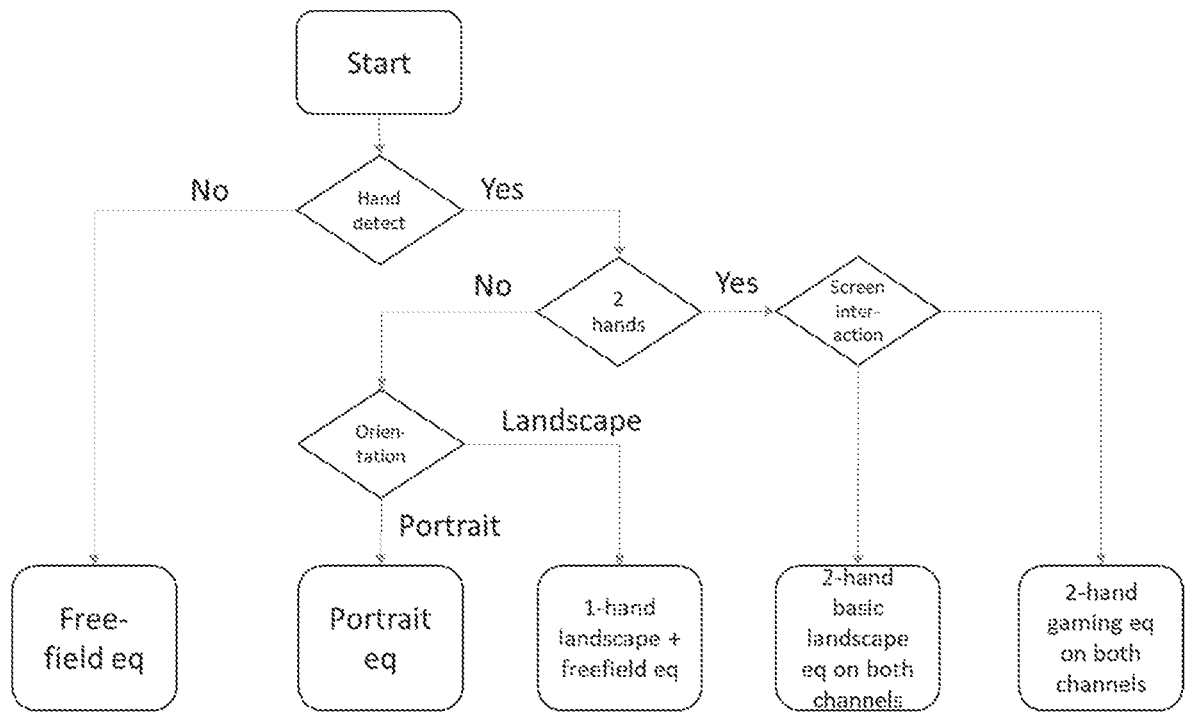
FIG. 8 is a schematic flow diagram of a strategy of equalization and stereo processing according to an embodiment of the present disclosure.

Step D: In response to determination of two-hand holding, determining whether the mobile terminal is in an interaction procedure, and conducting corresponding frequency response equalization and stereo processing control. As shown in FIG. 6, the frequency response will also change when held by one hand or two hands under the same landscape mode. In two-hand holding mode, the user may also interact with the screen (e.g., gaming), which also changes the shape and acoustic properties of the hand. If such an interaction is detected using for example touch screen output or monitoring system events, the audio processing can be further adjusted to a corresponding new mode.

In an embodiment, during step C, in response to determination of landscape holding, conducting landscape frequency response equalization and stereo processing control.

In an embodiment, during step C, in response to determination of portrait holding, conducting portrait frequency response equalization and stereo processing control.

In an embodiment, during step D, in response to determination of the mobile terminal not being in interaction, conducting a substantial two-channel landscape frequency response equalization and stereo processing control.

In an embodiment, during step D, in response to determination of the mobile terminal being in interaction, conducting a substantial interactive frequency response equalization and stereo processing control.

The method and system of sound processing for a mobile terminal based on hand-holding and orientation detection according to the above-mentioned embodiments effectively solve the technical problem that the frequency response of the speaker of the existing mobile terminal will significantly change with different holding postures that may eventually lead to poor sound quality. The method and system of sound processing provide more consistent speaker sound quality in real life compared with traditional mobile terminals which do not consider changes in the acoustic environment.

In an embodiment of the present disclosure, the mobile terminal includes but is not limited to a mobile device having a speaker, such as a mobile phone, a wearable device, and a virtual reality device, and preferably a mobile phone.

Based on the above embodiments, the present disclosure also provides a system of sound processing for a mobile terminal based on hand-holding and orientation detection, including a first detection module, a second detection module, a third detection module and a correction module.

The first detection module is configured to detect whether the mobile terminal is held by hand(s), and detect whether it is one-hand holding or two-hand holding.

The second detection module is configured to detect physical orientation of the mobile terminal, i.e., landscape holding or portrait holding.

The third detection module is configured to detecting whether the mobile terminal is in interaction. In an embodiment, the interaction may be achieved by touch of for example finger(s) or other parts of the user on the interaction interface of the mobile terminal. The interaction elements on the interaction interface of the mobile terminal may include, but not limited to, content elements such as icons, virtual buttons, typefaces or the like, or effect elements such as brightness, contrast, volume, vibration or the like, or any combinations of the interaction elements.

The correction module is configured to use the detected data from the first detection module, the second detection module and the third detection module to correct the frequency response of the speaker.

In an embodiment of the present disclosure, the first detection module includes means for detecting the holding posture of the mobile terminal, such as a touch sensor or other types of detectors.

In an embodiment of the present disclosure, the second detection module includes means for detecting the physical orientation of the mobile terminal.

In an embodiment of the present disclosure, the third detection module includes means for detecting whether the user interacts with the touch screen during audio playback.

In an embodiment of the present disclosure, the correction module includes means for modifying the frequency response of the speaker.

In embodiments of the present disclosure, the audio signal may be a plurality of audio channel signals, especially stereo signals. The term "stereo signal" may particularly denote the fact that the audio signal has at least two components, each component is intended to be reproduced by a different speaker, thereby producing a stereo effect or any other spatial sound perception. When the audio signal is a stereo signal, the widening algorithm may be particularly suitable for improving the subjective quality of the perceived audio.

The present disclosure may be a system, method and/or computer program product. The computer program product may include a computer-readable storage medium having computer-readable program instructions loaded thereon for causing a processor to implement various aspects of the present disclosure.

A computer-readable storage medium may be a tangible device that can hold and store instructions for use by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory sticks, floppy disks, mechanically coded devices, such as printers with instructions stored thereon, hole cards or raised structures in grooves, and any suitable combination of the above. Computer-readable storage media, as used herein, are not to be construed as transient signals per se, such as radio waves or other freely propagating electromagnetic waves, electromagnetic waves propagating through waveguides or other transmission media (e.g., light pulses through fiber optic cables), or through electrical wires transmitted electrical signals.

The computer readable program instructions described herein may be downloaded to various computing/processing devices from a computer readable storage medium, or to an external computer or external storage device over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The structure, features, and effects according to the present disclosure are described in detail above based on the embodiments shown in the drawings. The above are only preferred embodiments of the present disclosure. However, the above embodiment do not limit the scope of the present disclosure. Any changes or equivalent embodiments which still do not exceed the concept covered by the specification and illustrations should fall within the protection scope of the present disclosure.

What is claimed is:

1. A method of sound processing for a mobile terminal based on hand-holding and orientation detection, comprising:
    detecting whether the mobile terminal is held by hand;
    in response to determination of the mobile terminal being held by hand, detecting whether it is one-hand holding or two-hand holding;
    in response to determination of one-hand holding, detecting whether it is landscape holding or portrait holding, and conducting corresponding frequency response equalization and stereo processing control; and
    in response to determination of two-hand holding, determining whether the mobile terminal is in an interaction procedure, and conducting corresponding frequency response equalization and stereo processing control.

2. The method of claim 1, wherein in response to determination of landscape holding, conducting landscape frequency response equalization and stereo processing control.

3. The method of claim 1, wherein in response to determination of portrait holding, conducting portrait frequency response equalization and stereo processing control.

4. The method of claim 1, wherein in response to determination of the mobile terminal not being in interaction, conducting a substantial two-channel landscape frequency response equalization and stereo processing control.

5. The method of claim 1, wherein in response to determination of the mobile terminal being in interaction, conducting a substantial interactive frequency response equalization and stereo processing control.

6. A system of sound processing for a mobile terminal based on hand holding and orientation detection, comprising:
    a first detection module, configured to detect whether the mobile terminal is held by hand(s), and detect whether it is one-hand holding or two-hand holding;
    a second detection module, configured to detect physical orientation of the mobile terminal, the physical orientation comprising landscape holding or portrait holding;
    a third detection module, configured to detecting whether the mobile terminal is in interaction; and
    a correction module, configured to use the detected data from the first detection module, the second detection module and the third detection module to correct a frequency response of a speaker.

7. The system of claim 6, wherein the first detection module comprises means for detecting a holding posture of the mobile terminal.

8. The system of claim 6, wherein the second detection module comprises means for detecting a physical orientation of the mobile terminal.

9. The system of claim 6, wherein the third detection module comprises means for detecting whether a user interacts with a touch screen during audio playback.

10. The system of claim 6, wherein the correction module comprises means for correcting the frequency response of the speaker.

* * * * *